US 6,780,137 B1

(12) United States Patent
Langenfeld

(10) Patent No.: US 6,780,137 B1
(45) Date of Patent: Aug. 24, 2004

(54) DIFFERENTIAL LOCK MECHANISM

(75) Inventor: Thomas J. Langenfeld, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 10/219,912

(22) Filed: Aug. 15, 2002

Related U.S. Application Data
(60) Provisional application No. 60/398,664, filed on Jul. 26, 2002.

(51) Int. Cl.⁷ .............................................. F18H 48/20
(52) U.S. Cl. ...................................................... 475/231
(58) Field of Search ................................ 475/221, 230, 475/231

(56) References Cited

U.S. PATENT DOCUMENTS

| | | |
|---|---|---|
| 1,446,545 A | 2/1923 | Brush et al. |
| 1,691,230 A | 11/1928 | Dennison |
| 1,983,841 A | 12/1934 | Drexler |
| 2,209,966 A | 8/1940 | Goeller |
| 2,566,601 A | 9/1951 | Cousins |
| 2,771,791 A | 11/1956 | Bachman |
| 2,774,253 A | 12/1956 | Minard et al. |
| 2,785,369 A | 3/1957 | Ligh |
| 2,985,035 A | 5/1961 | Toth |
| 3,029,661 A | 4/1962 | Schmitter |
| 3,090,253 A | 5/1963 | Linsley et al. |
| 3,264,900 A | 8/1966 | Hartupee |
| 3,528,323 A | 9/1970 | Kamlukin |
| 3,811,342 A | 5/1974 | Barthel |
| 3,871,249 A | 3/1975 | Jeffers |
| 3,915,032 A | 10/1975 | Ottemann |
| 3,916,728 A | 11/1975 | Behar et al. |
| 4,050,534 A | 9/1977 | Nelson et al. |
| 4,077,279 A | 3/1978 | Goscenski, Jr. |
| 4,227,427 A | 10/1980 | Dick |
| 4,238,013 A | 12/1980 | Goscenski, Jr. |
| 4,244,241 A | 1/1981 | Treadwell |
| 4,280,375 A | 7/1981 | Goscenski, Jr. |
| 4,290,321 A | 9/1981 | Wilson |
| 4,294,218 A | 10/1981 | King et al. |
| 4,389,909 A | 6/1983 | Goscenski, Jr. |
| 4,480,501 A | 11/1984 | von Xaler |
| 4,524,856 A | 6/1985 | Renaud |
| 4,696,164 A | 9/1987 | Giere |
| 4,781,259 A | 11/1988 | Yamaoka et al. |
| 4,834,319 A | 5/1989 | Ewy et al. |
| 4,838,118 A | 6/1989 | Binkley |
| 4,862,767 A | 9/1989 | Hauser |
| 4,867,008 A | 9/1989 | Yamaoka et al. |
| 4,907,470 A | 3/1990 | Kasemeier et al. |
| 4,930,367 A | 6/1990 | Nagasawa |
| 4,938,738 A | 7/1990 | Fuelberth et al. |
| 4,959,043 A | 9/1990 | Klotz et al. |
| 4,973,296 A | 11/1990 | Shibahata |
| 4,979,582 A | 12/1990 | Forster |
| 5,007,886 A | 4/1991 | Holmquist et al. |
| 5,019,021 A | 5/1991 | Janson |

(List continued on next page.)

FOREIGN PATENT DOCUMENTS

JP 361130646 * 6/1986 ................. 475/231

Primary Examiner—Ha Ho
(74) Attorney, Agent, or Firm—Neal, Gerber & Eisenberg, LLP

(57) ABSTRACT

A differential lock mechanism for use in a vehicle and having a cam mechanism that may be actuated by the vehicle user. The cam mechanism transfers rotational movement to linear movement along the axis of the vehicle axles to move an engagement mechanism into or out of engagement with an axle bevel gear. The engagement mechanism is also engaged to and rotates with a differential carrier, and thus when it is in the engaged position, it locks the vehicle axles to rotate with the differential carrier.

36 Claims, 21 Drawing Sheets

U.S. PATENT DOCUMENTS

| | | |
|---|---|---|
| 5,055,095 A | 10/1991 | Osenbaugh et al. |
| 5,092,825 A | 3/1992 | Goscenski, Jr. et al. |
| 5,098,360 A * | 3/1992 | Hirota .................... 475/231 X |
| 5,156,576 A | 10/1992 | Johnson |
| 5,158,507 A * | 10/1992 | Guimbretiere .............. 475/231 |
| 5,171,192 A * | 12/1992 | Schlosser et al. ....... 475/231 X |
| 5,183,446 A | 2/1993 | Hughes |
| 5,201,692 A | 4/1993 | Johnson et al. |
| 5,215,506 A | 6/1993 | Hara |
| 5,284,065 A | 2/1994 | Loeffler et al. |
| 5,314,387 A | 5/1994 | Hauser et al. |
| 5,317,936 A | 6/1994 | Shiba et al. |
| 5,323,890 A | 6/1994 | Okada |
| 5,330,394 A | 7/1994 | Hauser et al. |
| 5,339,708 A | 8/1994 | Nakumura |
| 5,342,255 A | 8/1994 | Slesinski et al. |
| 5,386,742 A | 2/1995 | Irikura et al. |
| 5,404,772 A | 4/1995 | Jester |
| 5,461,941 A * | 10/1995 | Young .................... 475/231 X |
| 5,484,347 A | 1/1996 | Holmquist |
| 5,528,958 A | 6/1996 | Hauser |
| 5,549,523 A | 8/1996 | Doucet |
| 5,558,592 A | 9/1996 | Honlinger et al. |
| 5,584,777 A | 12/1996 | Sander et al. |
| 5,613,409 A | 3/1997 | Hauser |
| 5,647,249 A | 7/1997 | Okada et al. |
| 5,647,814 A | 7/1997 | Krisher |
| 5,664,465 A | 9/1997 | Okada et al. |
| 5,782,717 A | 7/1998 | Smothers et al. |
| 5,807,200 A | 9/1998 | Hauser |
| 5,816,971 A | 10/1998 | Zentmyer et al. |
| 5,863,271 A | 1/1999 | Schreier et al. |
| 5,897,452 A | 4/1999 | Schreier et al. |
| 5,899,826 A | 5/1999 | Schreier et al. |
| 5,984,822 A | 11/1999 | Schreier et al. |
| 6,007,449 A | 12/1999 | Okada et al. |
| 6,015,362 A | 1/2000 | Irikura et al. |
| 6,024,665 A | 2/2000 | Hauser |
| 6,027,422 A * | 2/2000 | Yamazaki .................... 475/231 |
| 6,027,424 A | 2/2000 | Reynolds |
| 6,056,663 A | 5/2000 | Fett |
| 6,520,885 B2 * | 2/2003 | Gassmann et al. .......... 475/231 |

* cited by examiner

DIFFERENTIAL LOCK MECHANISM

CROSS REFERENCE TO RELATED APPLICATION

This application claims the benefit of U.S. Provisional Patent Application Serial No. 60/398,664, filed Jul. 26, 2002, which is incorporated herein by reference in its entirety.

BACKGROUND OF THE INVENTION

This invention relates to differentials used in transmissions.

SUMMARY OF THE INVENTION

This invention is directed to a locking mechanism used in vehicle differentials. The invention is described in connection with an integrated hydrostatic transaxle, i.e., a transaxle incorporating both a hydrostatic transmission having a hydraulic pump and motor as well as output gearing, and a differential. The specific transaxle depicted is very similar to that shown in U.S. Pat. Nos. 5,613,409 and 5,782,717, the terms of which are incorporated herein by reference. But it will be understood by those of skill in the art that the differential mechanism disclosed herein is not limited to use with such an integrated hydrostatic transaxle. Rather, this invention could be used with non-hydrostatic transaxles, other types of hydrostatic transaxles, four wheel drive vehicles and the like.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
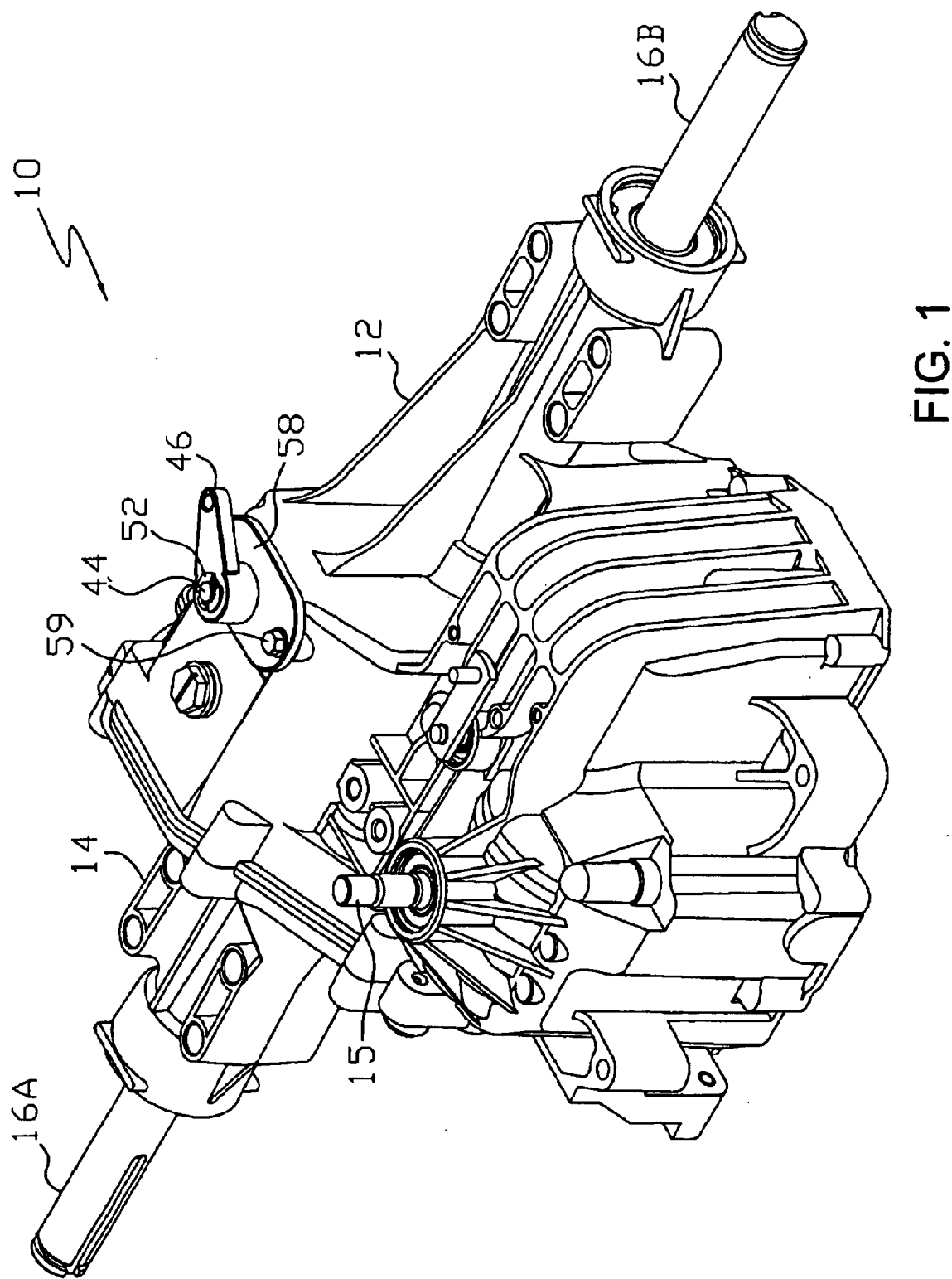
FIG. 1 is a perspective view of a transaxle incorporating the present invention.
Figure 2:
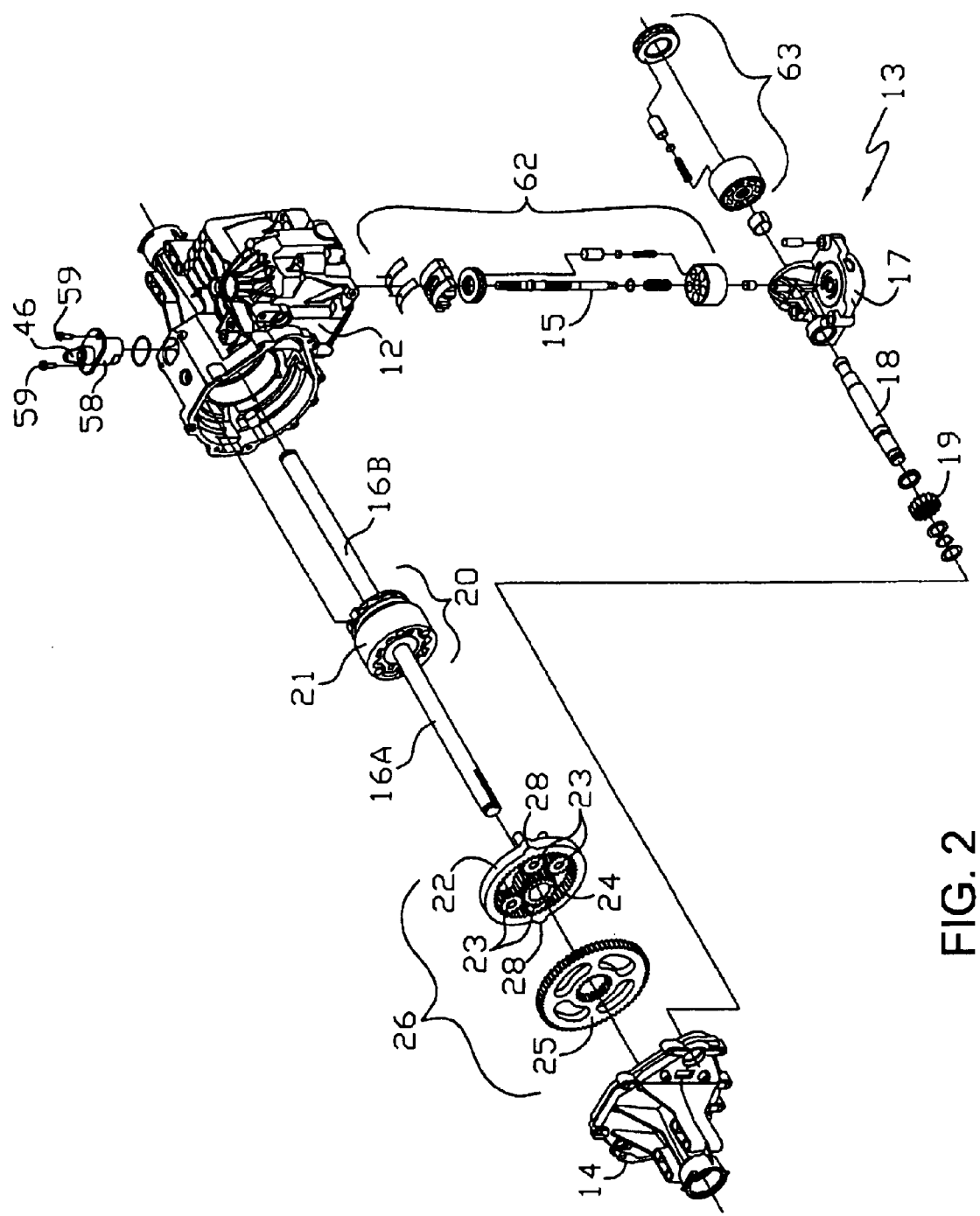
FIG. 2 shows an exploded view of a hydrostatic transaxle incorporating a first embodiment the present invention.

A first embodiment of this invention is depicted in FIGS. 1–14. FIGS. 1 and 2 show an integrated hydrostatic transaxle 10 having a main casing 12 and a side casing 14. An input shaft 15 is mounted in main casing 12 to drive the hydraulic pump 62 of the hydrostatic transmission 13 mounted inside transaxle casings 12 and 14. Pump 62 and motor 63, both of which are mounted on center section 17, are of the axial piston design. FIG. 2 does not show every feature of pump 62 and motor 63, as such elements are well known in the art. As noted above, this specific embodiment is shown for illustrative purposes only and the invention is not limited to this type of integrated hydrostatic transaxle or to hydrostatic transaxles as a general category. The hydrostatic transmission and its connection to the differential is disclosed in detail in U.S. Pat. No. 5,782,717, the terms of which are incorporated by reference.

Axles 16A and 16B are coaxially mounted in the housing and are connected by differential 20. Planetary reduction 26 is mounted on axle 16A and the components thereof are shown most clearly in the exploded view shown in FIG. 3. A sun gear 24 and four planet gears 23 are mounted inside ring gear 22. Planet gears 23 are each mounted on a separate planet pin 27 corresponding thereto. It should be noted that these planetary gear components are shown merely for completeness and are not required to use the invention disclosed herein. This invention could be used with a wide variety of different types of differentials.

The rotational output of the hydrostatic transmission 13 is transferred through a gear 19, mounted on hydraulic motor output shaft 18 or some other means to rotate spur gear 25. Spur gear 25 is engaged to sun gear 24, about which rotate a plurality of planet gears 23 mounted in ring gear 22. Planet gears 23 are each mounted on respective planet pins 27 which are engaged to planet carrier 21, which functions as a differential housing. While this embodiment depicts planet carrier 21 as having a multitude of functions, it will be understood that a differential housing would fall within the scope of this invention as long as it restrains the engagement mechanism and provides an interface with the cam mechanism, both of which are described herein, and it rotates with the differential input gear, which is spur gear 25 in this embodiment.

Ring gear 22 is mounted in a fixed manner inside axle housing 12, using notches or tabs 28 which mate with corresponding features in axle housing 12 to prevent rotation of ring gear from rotating with respect thereto.

Thrust washers are used as needed within this mechanism, as will be understood by one of skill in the art. As depicted, thrust washer 29A is mounted between planet gears 23 and pins 27 and the spur gear 25. A second thrust washer 29B is mounted to absorb thrust forces between sun gear 24 and an axle bushing (not shown). A third thrust washer 29C is mounted between bevel gear 31A and sun gear 24, while a similar thrust washer 29F is mounted between bevel gear 31B and another bushing (not shown). A fourth thrust washer 29D is mounted in housing 12 to absorb forces from planet carrier 21. Additional bushings or other mounting paraphernalia may be used as needed, and one of skill in the art could adjust these elements as necessary depending on size, intended load and the like.

Figure 3:
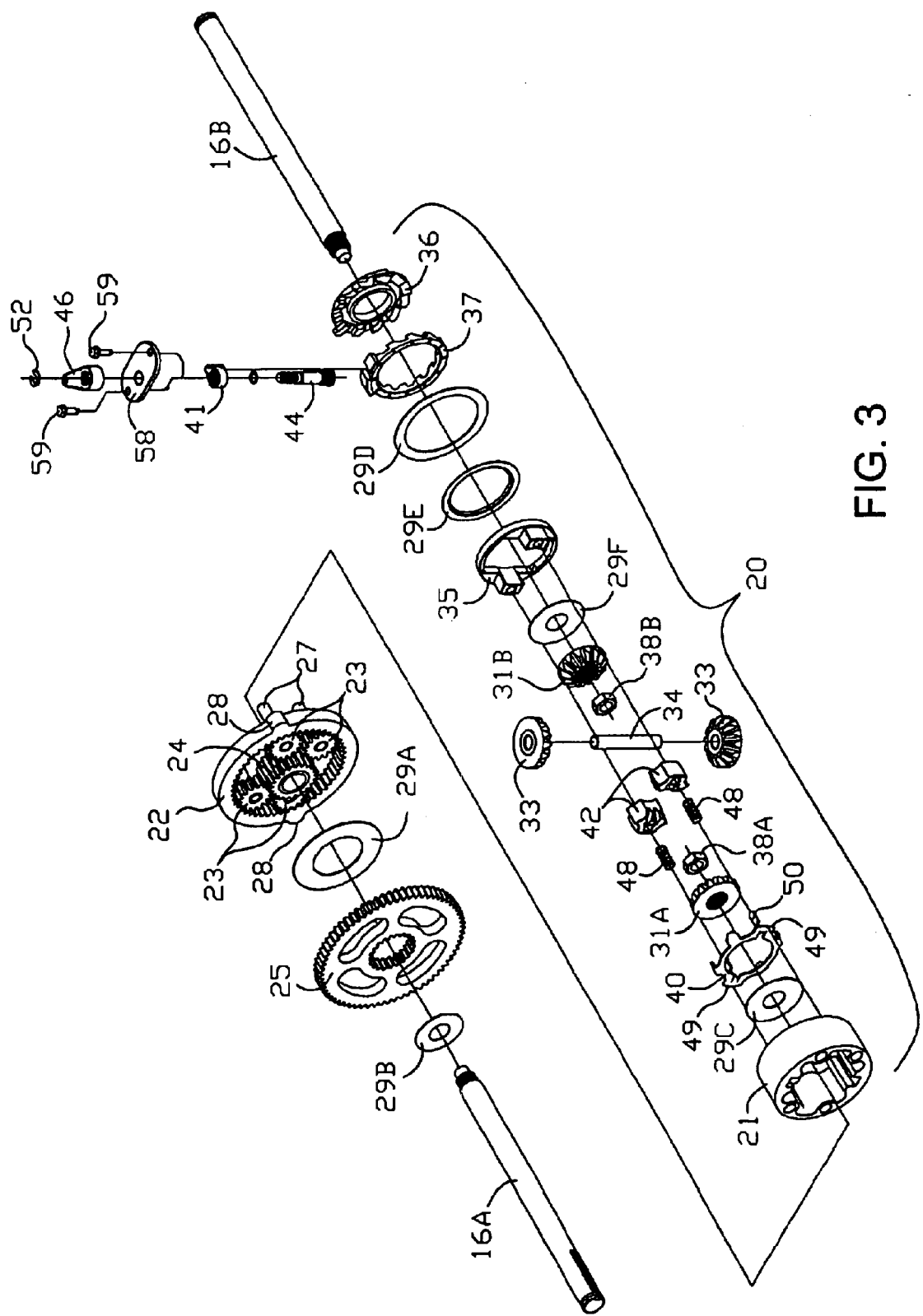
FIG. 3 is a further exploded view of the planetary reduction and the differential components of a first embodiment of the present invention.
Figure 4:
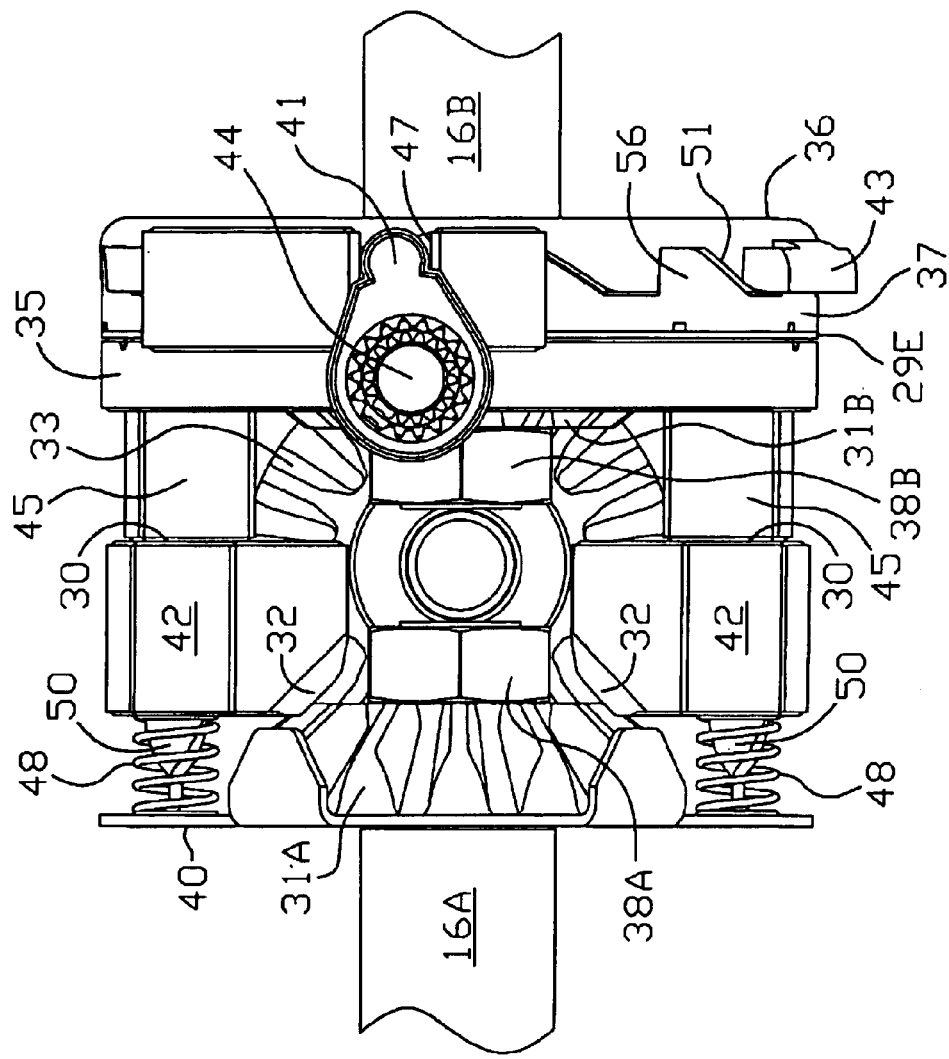
FIG. 4 is a top view of the differential mechanism of FIG. 3, with certain components removed for clarity, with the differential lock mechanism in the disengaged position.

The components of differential 20 are shown most clearly in the exploded view of FIG. 3 and in FIG. 4. A pair of axle bevel gears 31A and 31B are mounted on and drive the coaxial output axles 16A and 16B, respectively, and are secured thereto by nuts 38A and 38B. A pair of planet bevel gears 33 are mounted on cross shaft 34 and engage axle bevel gears 31A and 31B, which are mounted so that their respective gear teeth are facing inwards towards one another. Cross shaft 34 is mounted in and rotated by planet carrier 21.

The locking ability of this differential enables the user to selectively engage and disengage various elements to permit axle bevel gears 31A and 31B, and thus axles 16A and 16B, to rotate directly with planet carrier 21, eliminating any differentiating action.

This locking feature comprises a plurality of engagement devices 42 to act as the engagement or locking mechanism herein. These devices are often referred to as "gear dogs" or "dogs." It should be noted that only one such dog 42 is required for locking; more than one can be used depending on the life and strength of the unit required, and the invention is not limited to a specific number of such engagement elements. In the embodiment depicted, each dog 42 has a flat surface 30 on one side, and one or more gear teeth 32 on the opposite side thereof.

Figure 6:
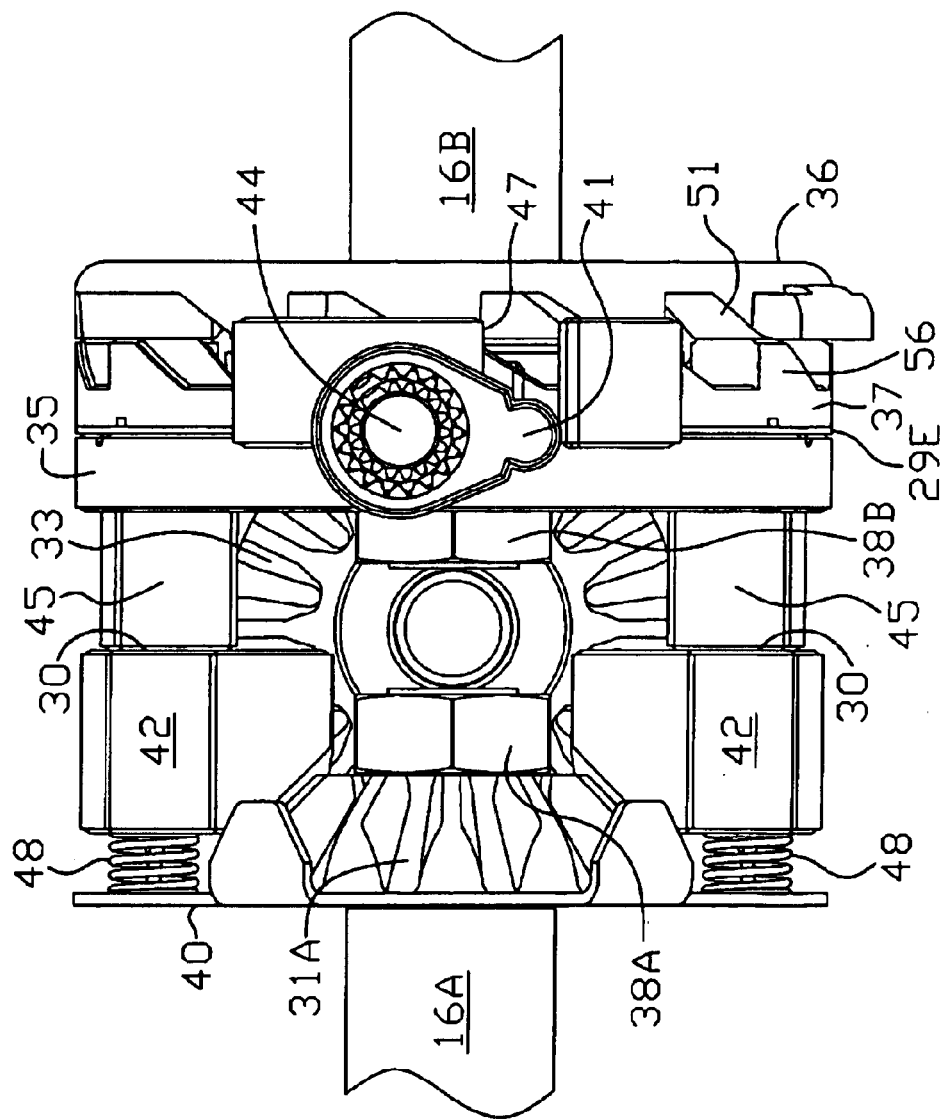
FIG. 6 is a top view of the differential lock mechanism of FIG. 3 in the engaged or actuated position, with certain elements removed for clarity.

In the disengaged position, such as is shown in FIG. 4, engagement dogs 42 are maintained in a position off bevel gear 31A by means of springs 48, which are preferably coil springs mounted on tines 50 of guide 40. In the engaged position, as shown in FIG. 6, teeth 32 of dogs 42 are pushed into and engage with bevel gear 31A. In the embodiment shown, guide 40 includes a plurality of tabs 49 integrally formed therewith to engage planet carrier 21, in order to reduce stress on tines 50; such engagement of guide 40 with planet carrier 21 is preferred but not required. Load plate 35 and engagement dogs 42 are engaged with and thus rotate with planet carrier 21. Thus, in the locked or engaged position, axle bevel gear 31A is locked with and rotate with planet carrier 21 through gear teeth 32 on dogs 42. This arrangement locks axle bevel gear 31A to planet carrier (or differential housing) 21, which then prevents rotation of planet bevel gears 33 about cross shaft 34, thus eliminating differentiating action.

Figure 5:
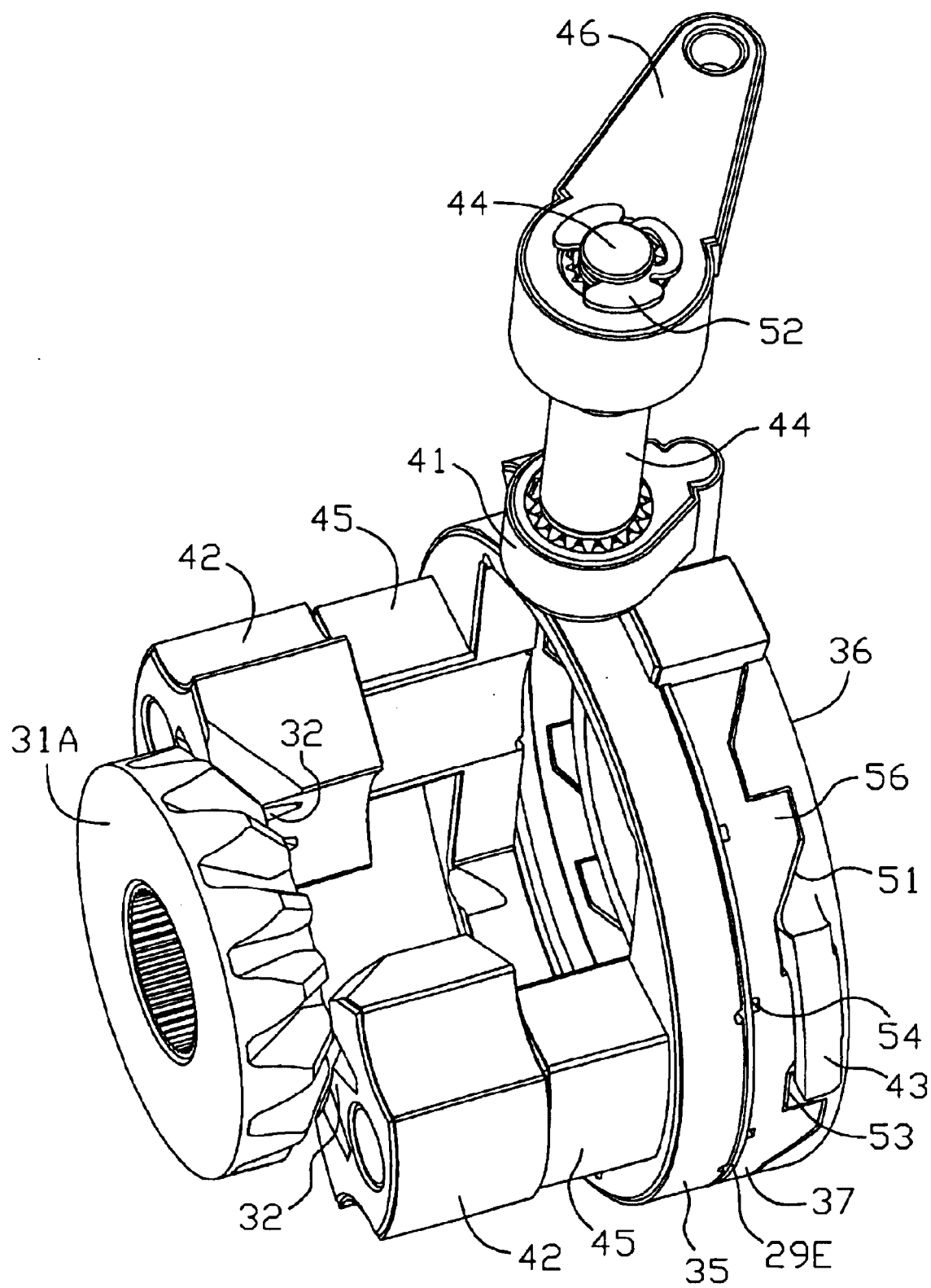
FIG. 5 is a detail perspective view of the cams and actuating mechanism shown in FIG. 4.
Figure 7:
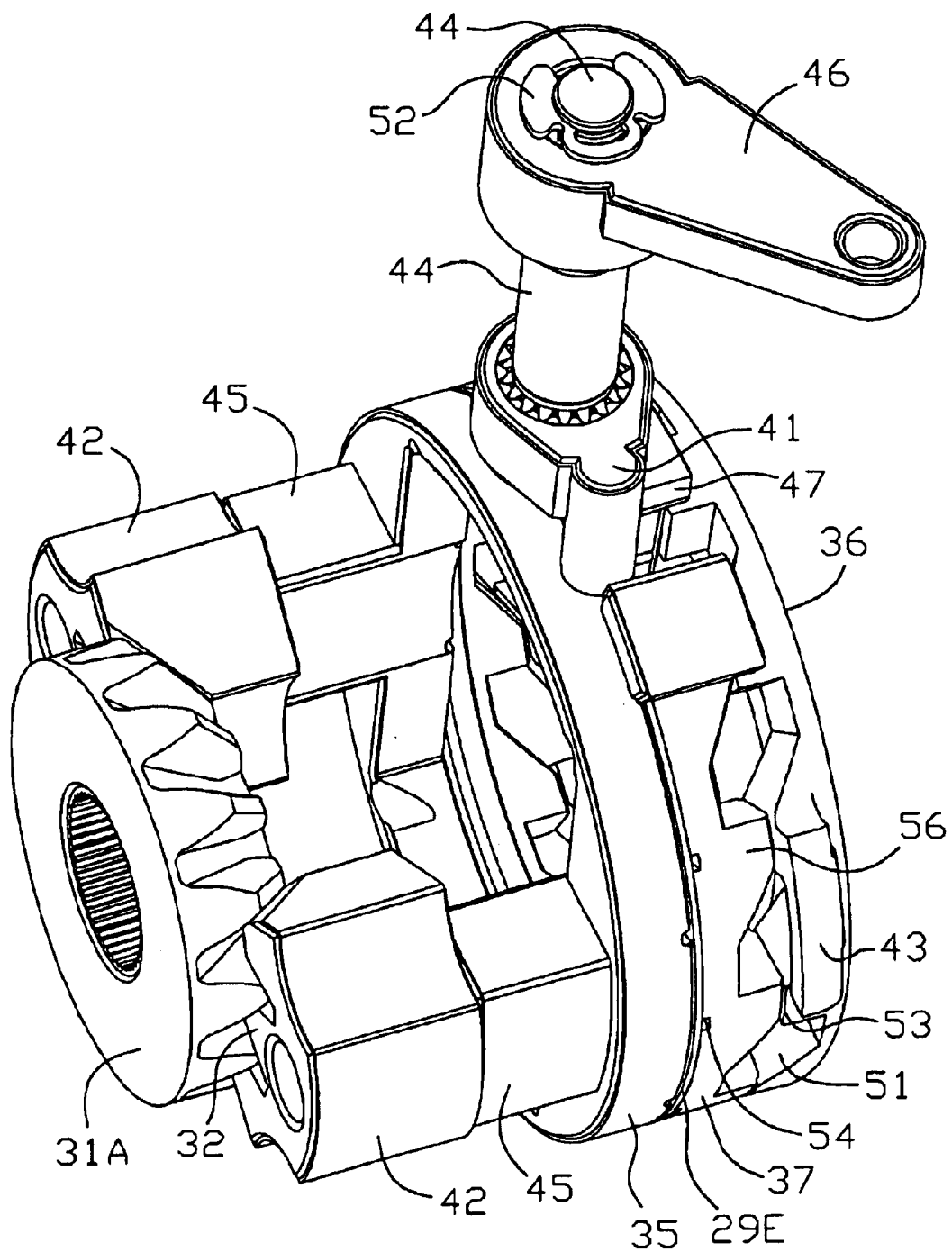
FIG. 7 is a detail perspective view of the cams and actuating mechanism of the mechanism shown in FIG. 6.
Figure 8:
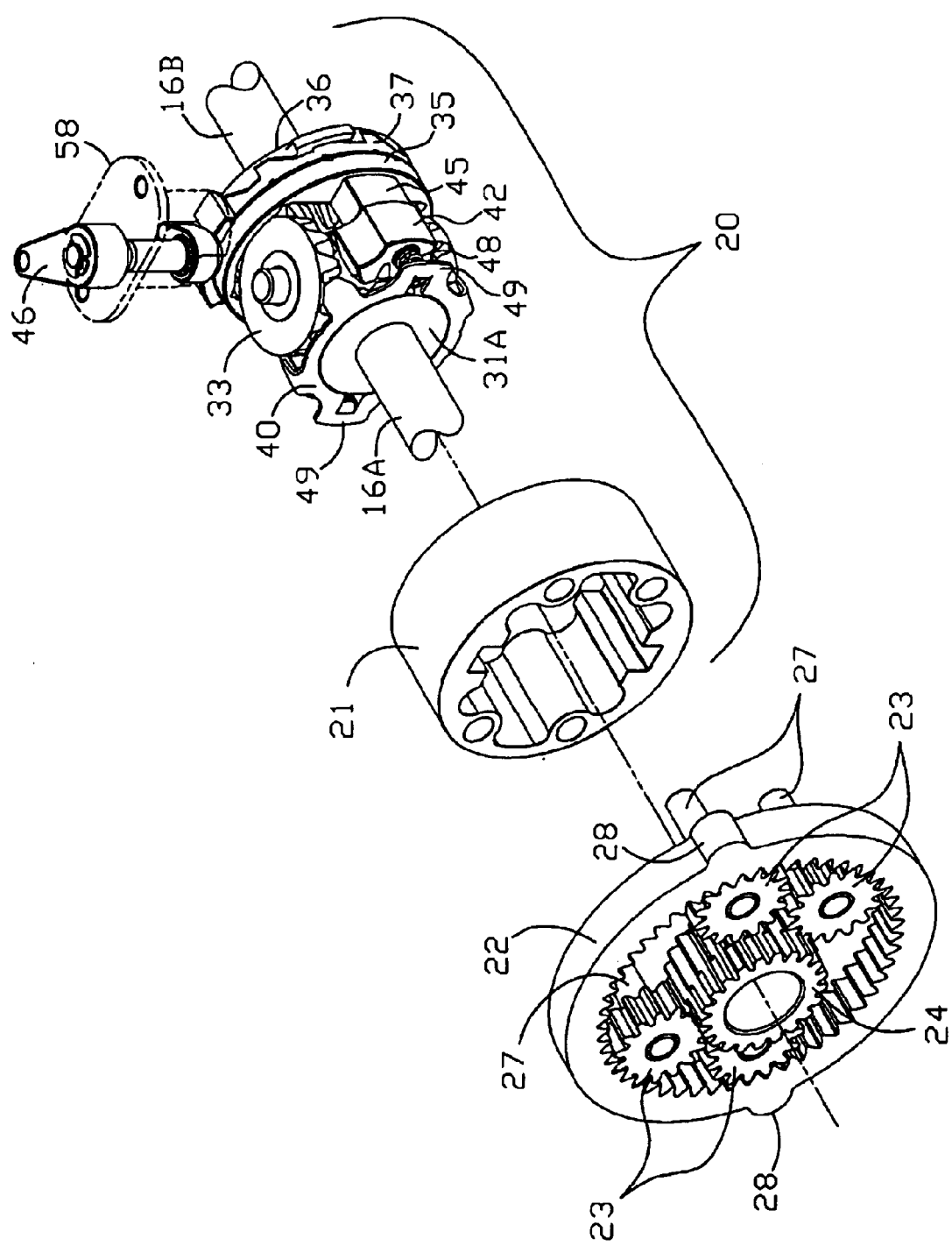
FIG. 8 is an exploded view of selected components of the differential in accordance with the first embodiment of the present invention.

The engagement of gear teeth 32 of dogs 42 with axle bevel gear 31 is accomplished by various cams and load plate 35. In FIGS. 4 and 6, one of the planet bevel gears 33, planet carrier 21 and actuator handle 46 have been removed for clarity. FIG. 5 shows these various cam mechanisms in the disengaged position and FIG. 7 shows these cams in the engaged position.

Figure 15:
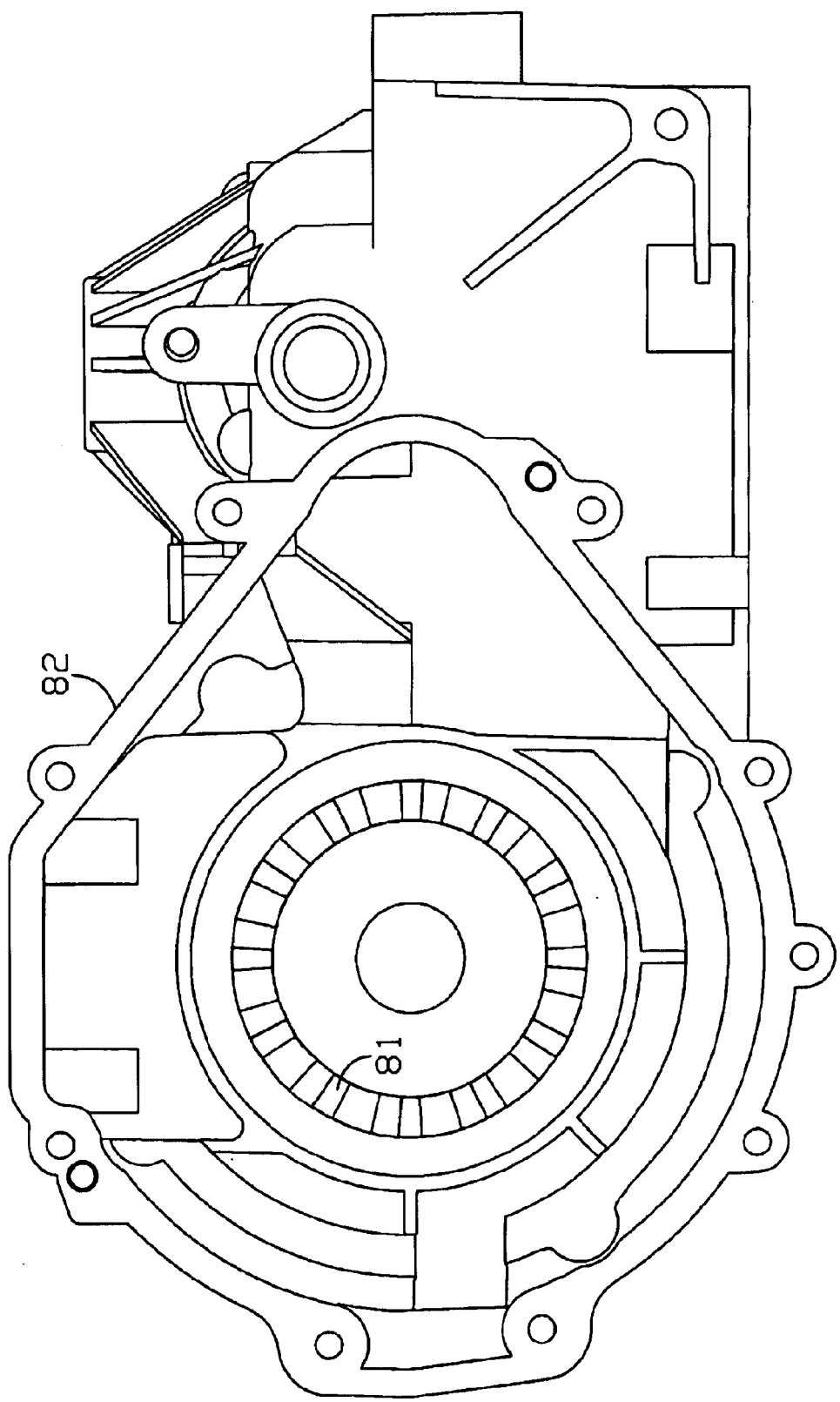
FIG. 15 is an end view of a second embodiment of the axle housing having the stationary cam mechanism integrally formed therewith.
Figure 16:
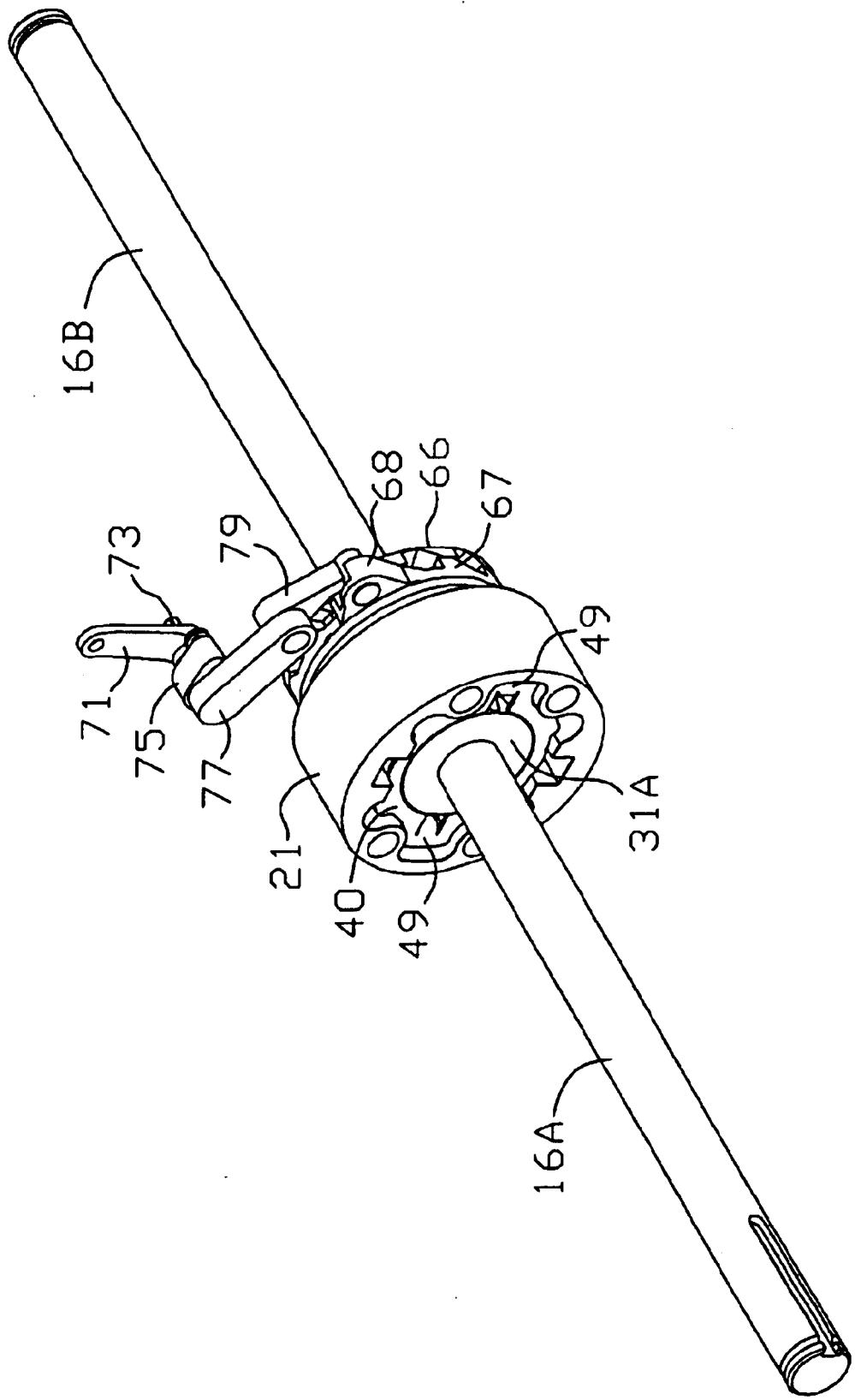
FIG. 16 is a perspective view of a third embodiment of this invention including an optional over-center linkage.
Figure 17:
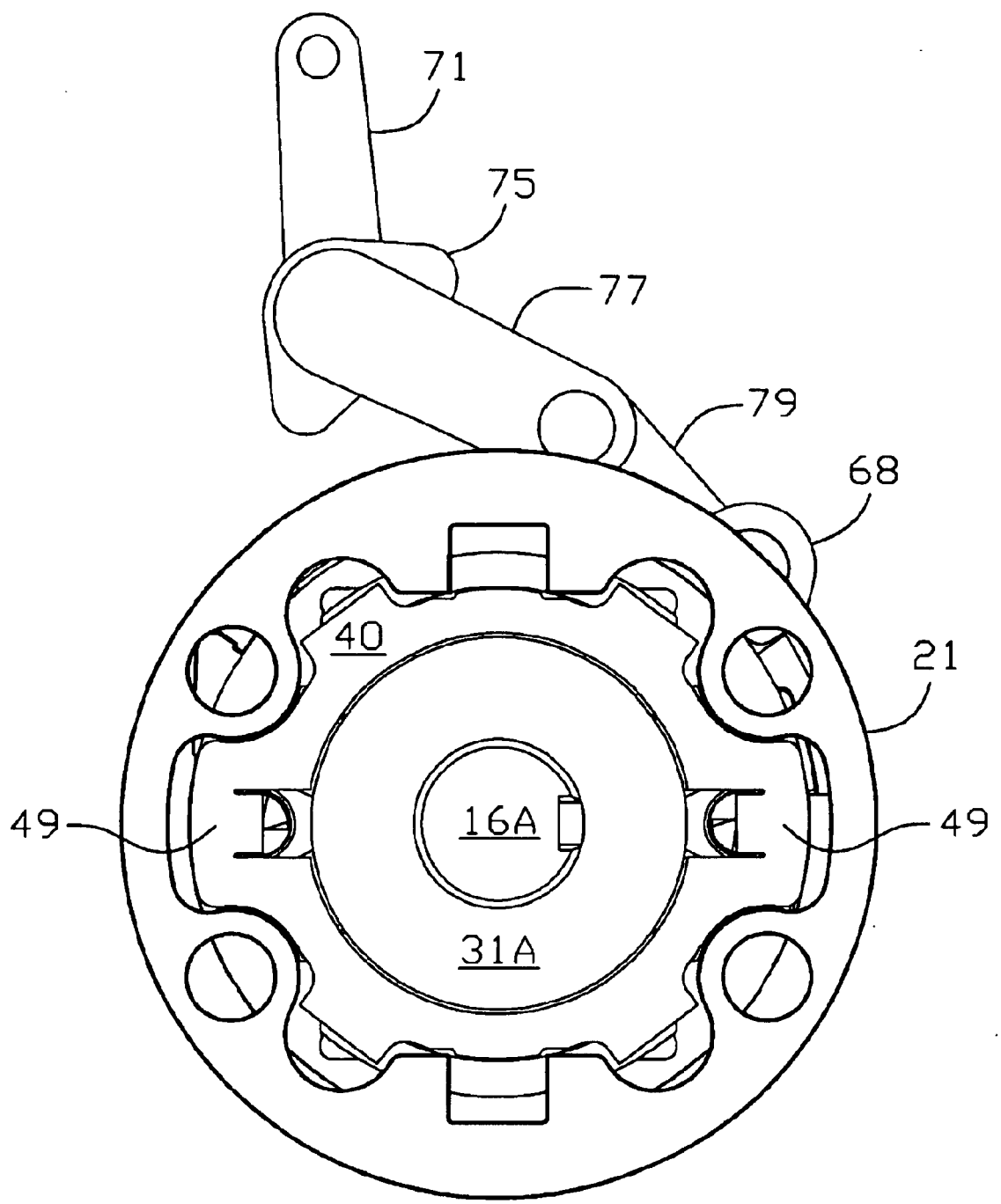
FIG. 17 is an end plan view of the mechanism shown in FIG. 16.
Figure 18:
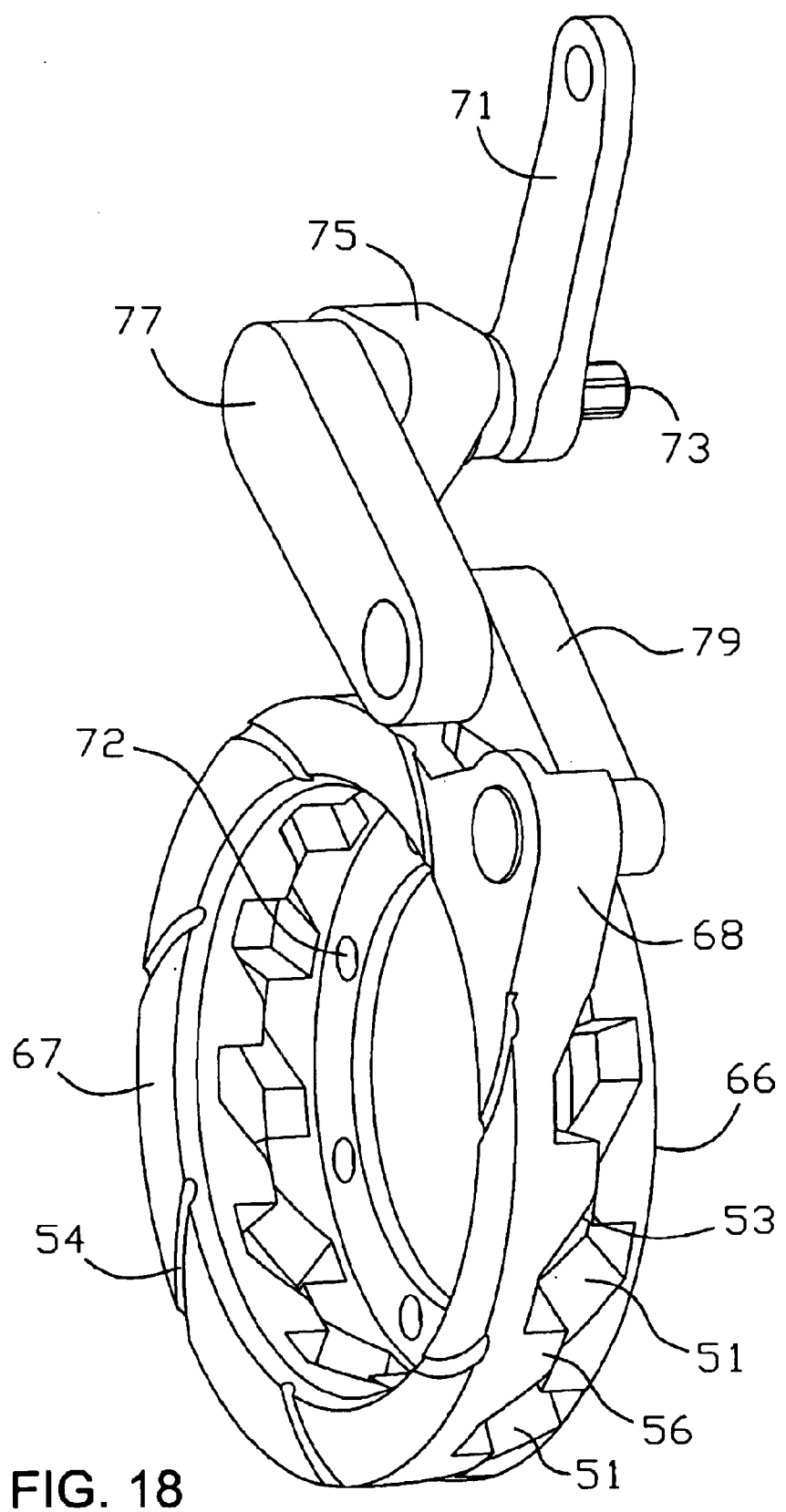
FIG. 18 is a detail perspective view of the cams and actuating mechanism of the embodiment shown in FIG. 16.
Figure 19:
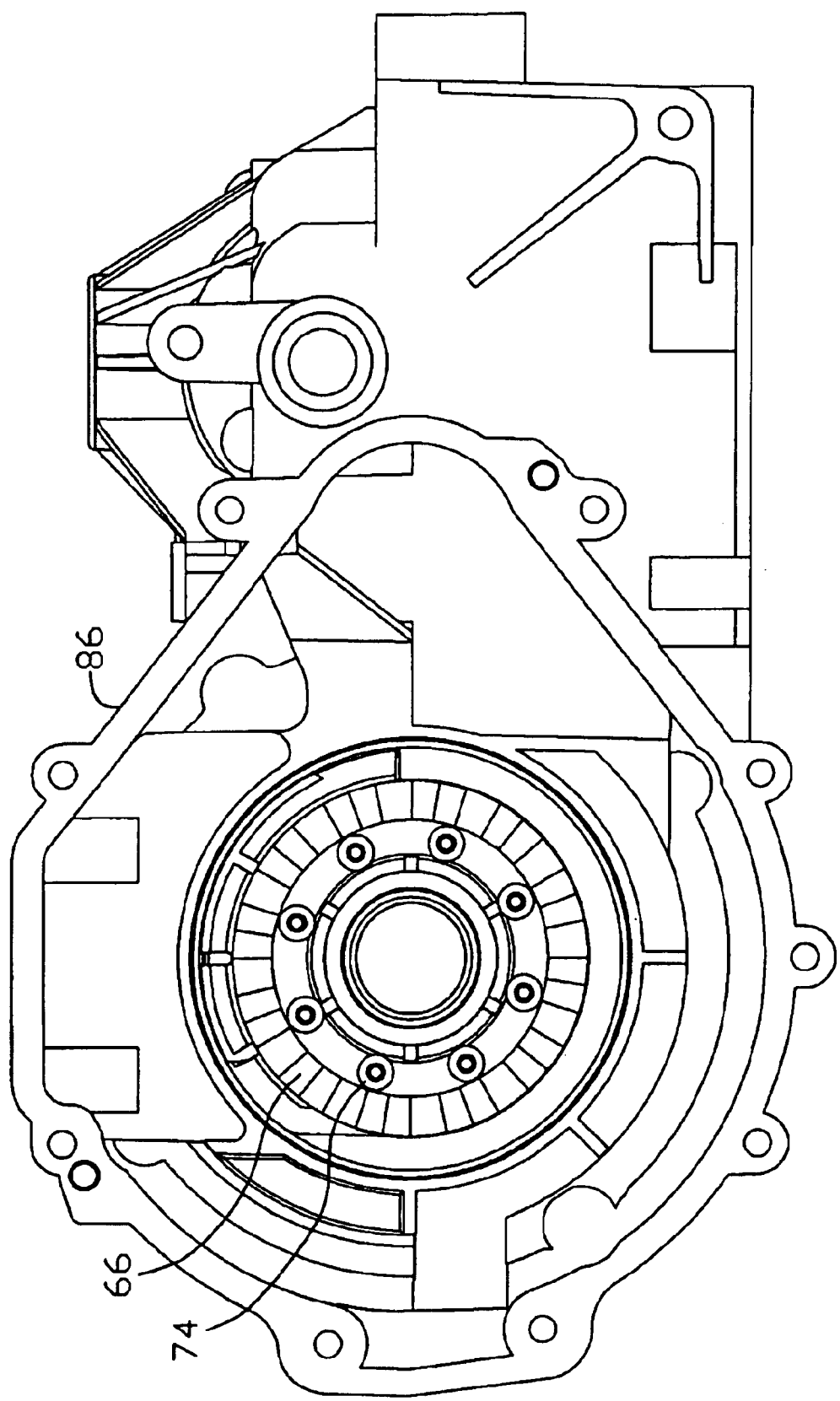
FIG. 19 is an end plan view of the stationary cam shown in FIG. 18 mounted in the axle housing.

Stationary cam 36 is mounted to transaxle housing 12 to prevent rotation of cam 36. In the embodiment shown in, e.g., FIGS. 3 and 12, this is accomplished by protrusions 43 that directly engage corresponding features on the inside of axle housing 12. In the alternative embodiment shown in FIGS. 16–19, stationary cam 66 has a plurality of screw openings 72. Cam 66 is secured to axle housing 86 through screws 74 or other fasteners secured to axle housing 86 through openings 72 in stationary cam 66; other means of securing cam 66 to the axle housing to prevent rotation could also be used. For example, as shown in FIG. 15, stationary cam teeth 81 could also be integrally formed with axle housing 82. For simplicity, the following discussion will form on stationary cam 36 as shown in, e.g., FIG. 12.

Figure 11:
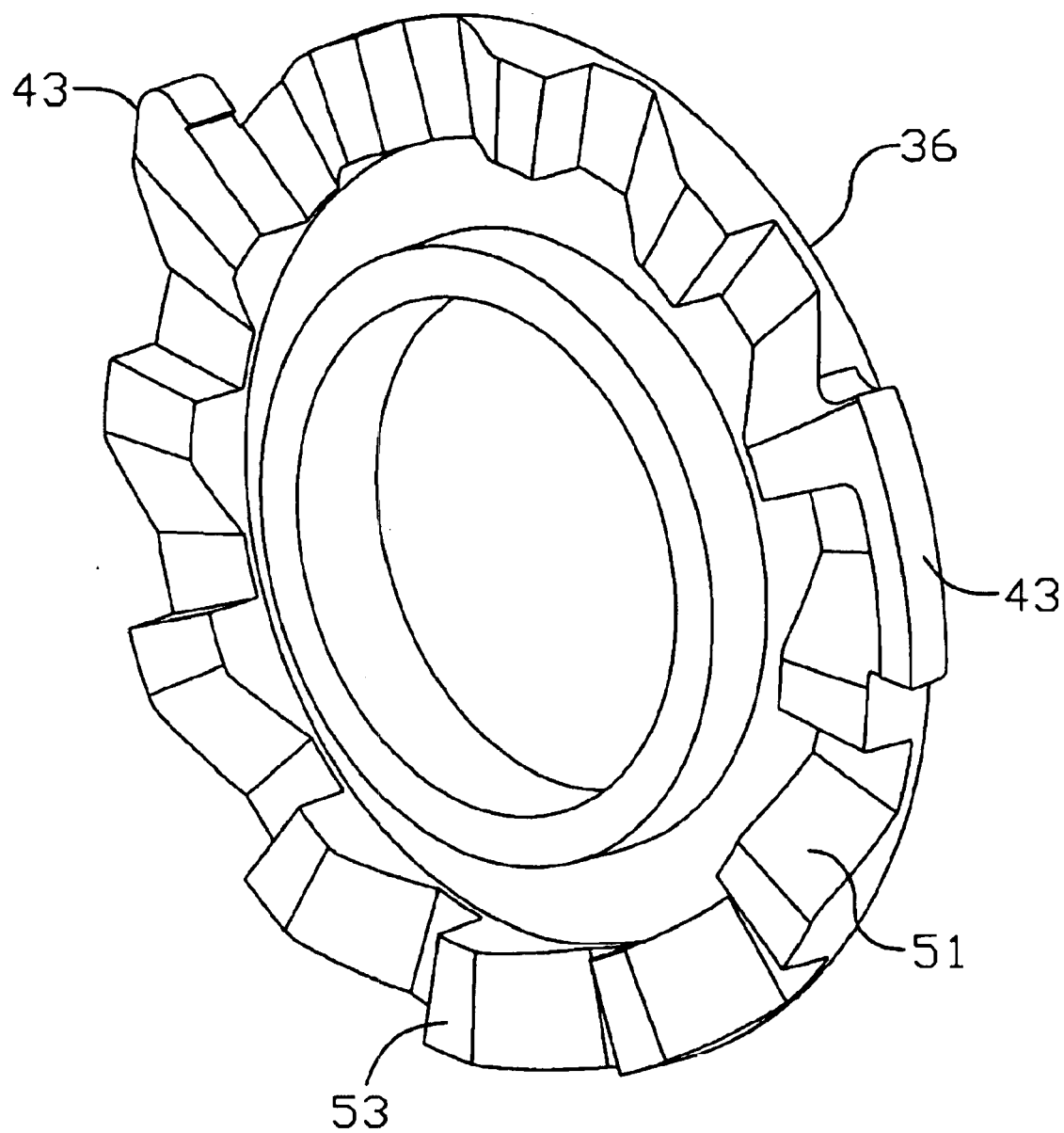
FIG. 11 is a perspective view of the stationary cam of the first embodiment of the present invention.
Figure 12:
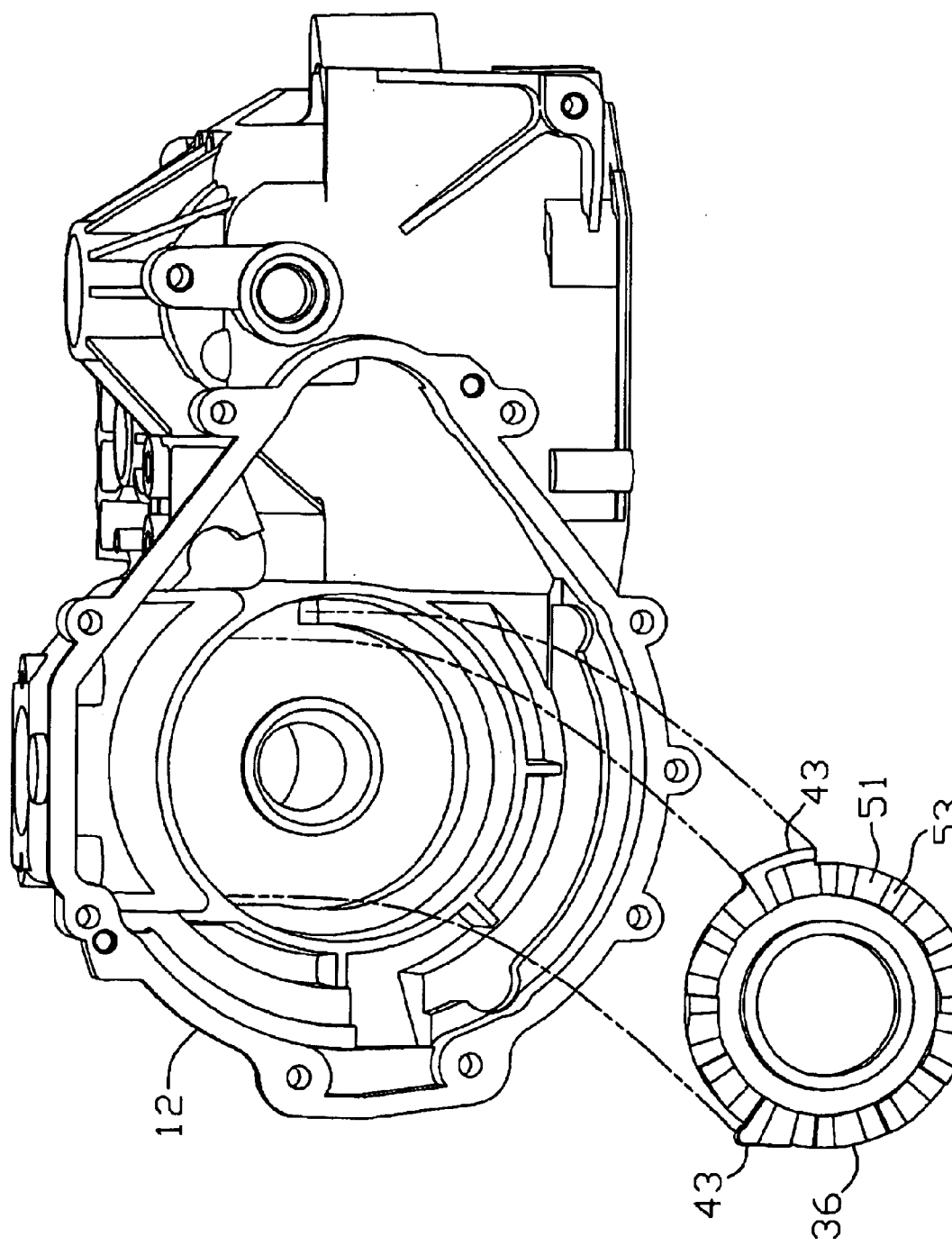
FIG. 12 is a partially exploded view showing the axle housing and stationary cam of the first embodiment of the present invention.
Figure 13:
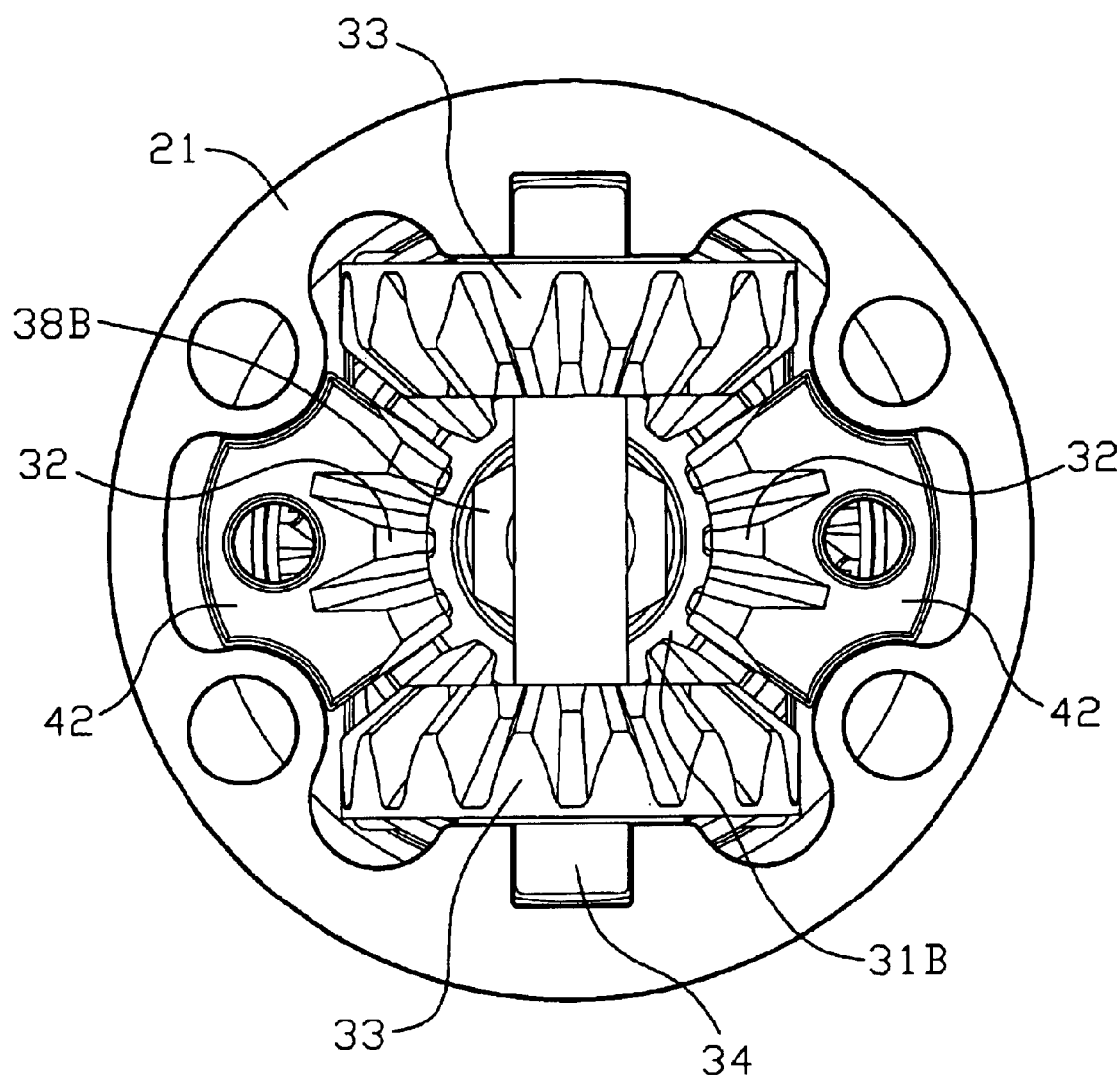
FIG. 13 is an end view of the first embodiment of the differential housing, and selected components mounted therein.

As shown most clearly in FIG. 11, stationary cam 36 includes a plurality of ramps 51 which would preferably be helical to reduce wear and loading; ramps 51 could also be flat or any other geometric configuration that would appropriately transfer the rotational cam movement to the necessary axial movement. This design would depend on the loads, total surface area and the size of the bevel gears, which would affect the distance that the engagement dogs 42 need to be translated.

Figure 9:
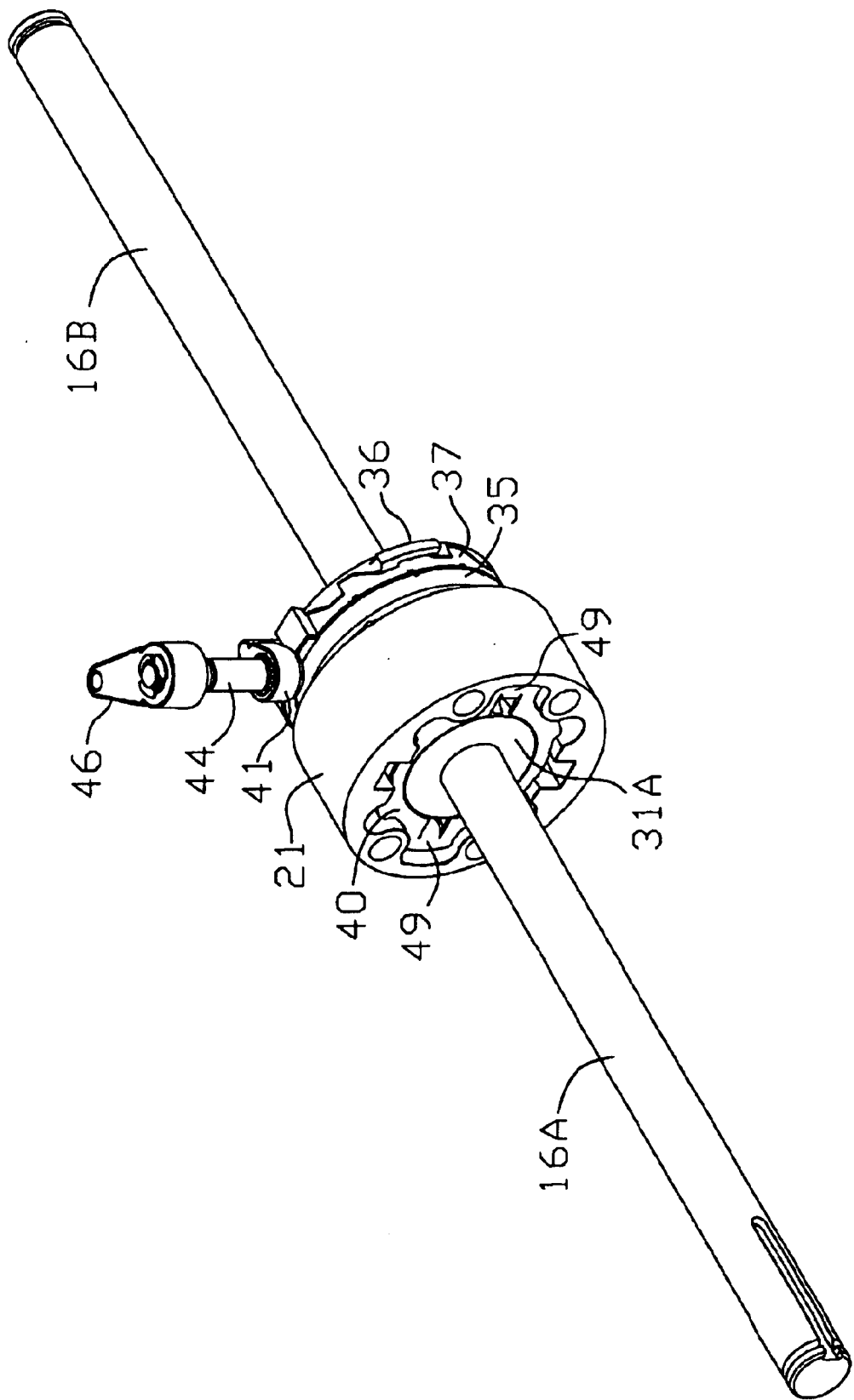
FIG. 9 is a perspective view of the differential housing and cam mechanism of the first embodiment of the present invention.
Figure 10:
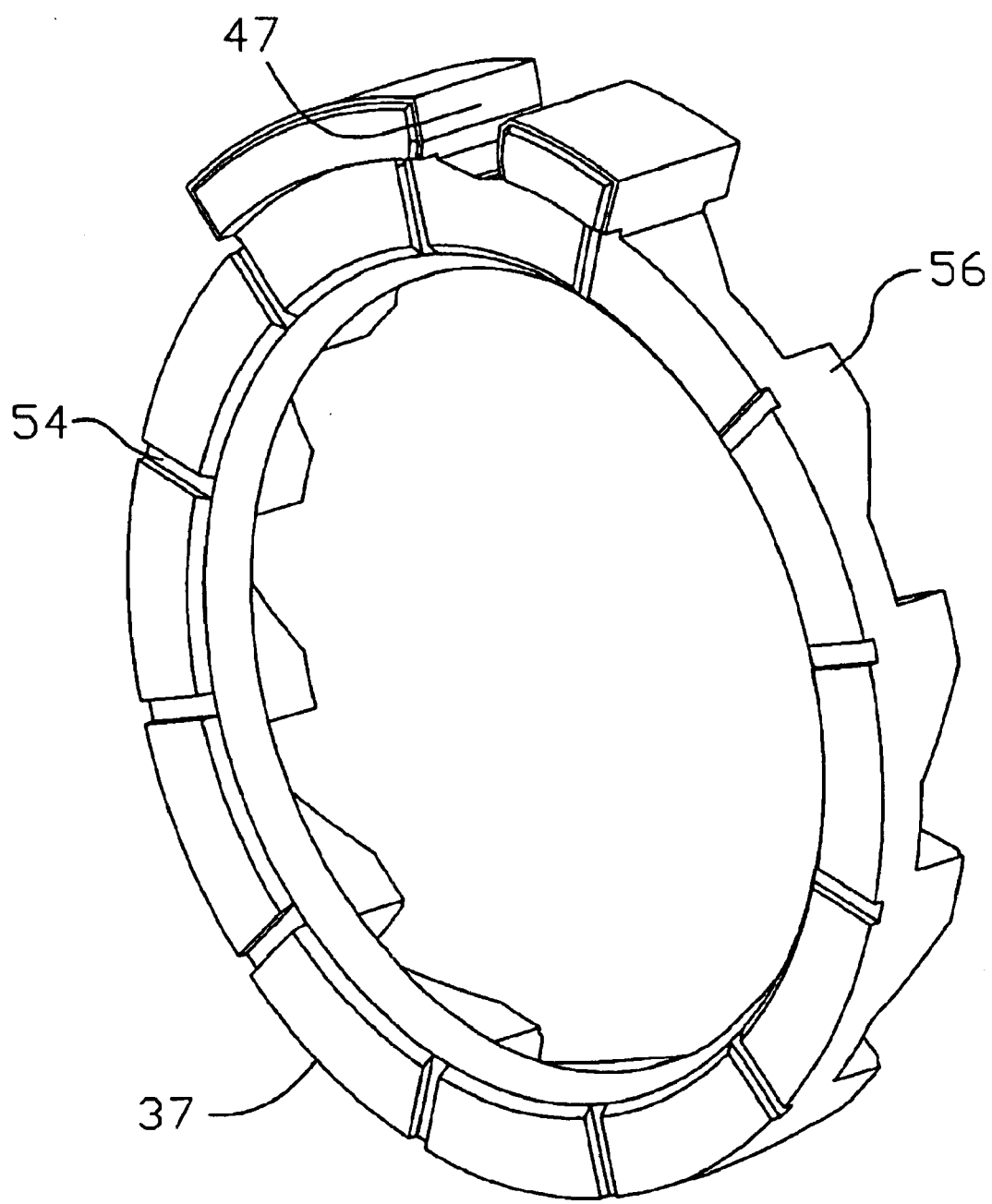
FIG. 10 is a perspective view of the rotating cam of the first embodiment of the present invention.

As shown most clearly in FIG. 10, rotating cam 37 has a plurality of teeth 56 corresponding to ramps 51 on stationary cam 36. When actuating cam 41 is in its first or disengaged position as shown in FIGS. 4, 5 and 9 stationary cam 36 and rotating cam 37 are in close mating relationship. Rotation of actuator handle 46 transfers this rotation through shaft 44 to actuating cam 41, which is mounted in slot 47 located on rotating cam 37. As will be understood, movement of actuating cam 41 to its second or engaged position as shown in FIGS. 6 and 7 causes teeth 56 of rotating cam 37 to travel up ramp 51 to engage flats 53, thus moving rotating cam 37 in an axial direction away from stationary cam 36. This axial motion is transmitted through thrust bearing 29E to load plate 35. Load plate 35 has two arms 45 integrally formed therewith which directly contact the flat surface 30 of engagement dogs 42, to force dogs 42 to similarly move in an axial direction, placing gear teeth 32 into contact with axle bevel gear 31A, locking the differential.

This construction keeps the unit in the locked position; the contact with flat 53 prevents teeth 56 from moving back down ramp 51, thus moving rotating cam 37 towards stationary cam 36, taking the unit out of engagement, unless and until the actuating cam 41 is moved by the user back to the appropriate position. When actuating cam 41 is fully actuated, the portion that mates with slot 47 is past the center of rotation of shaft 44 with respect to force from motion of rotating cam 37, thus forming an over-center design, as can be best seen in FIG. 6. Thus in the actuated or engaged position, any force from rotating cam 37 will be directed to keeping actuating cam 41 in the engaged position, thereby preventing a disengaging force from being transmitted back through the attached vehicle linkage (not shown). Oil grooves 54 are formed in the surface of rotating cam 37 that engages thrust washer 29E for the purpose of improving lubrication of these parts.

Figure 14:
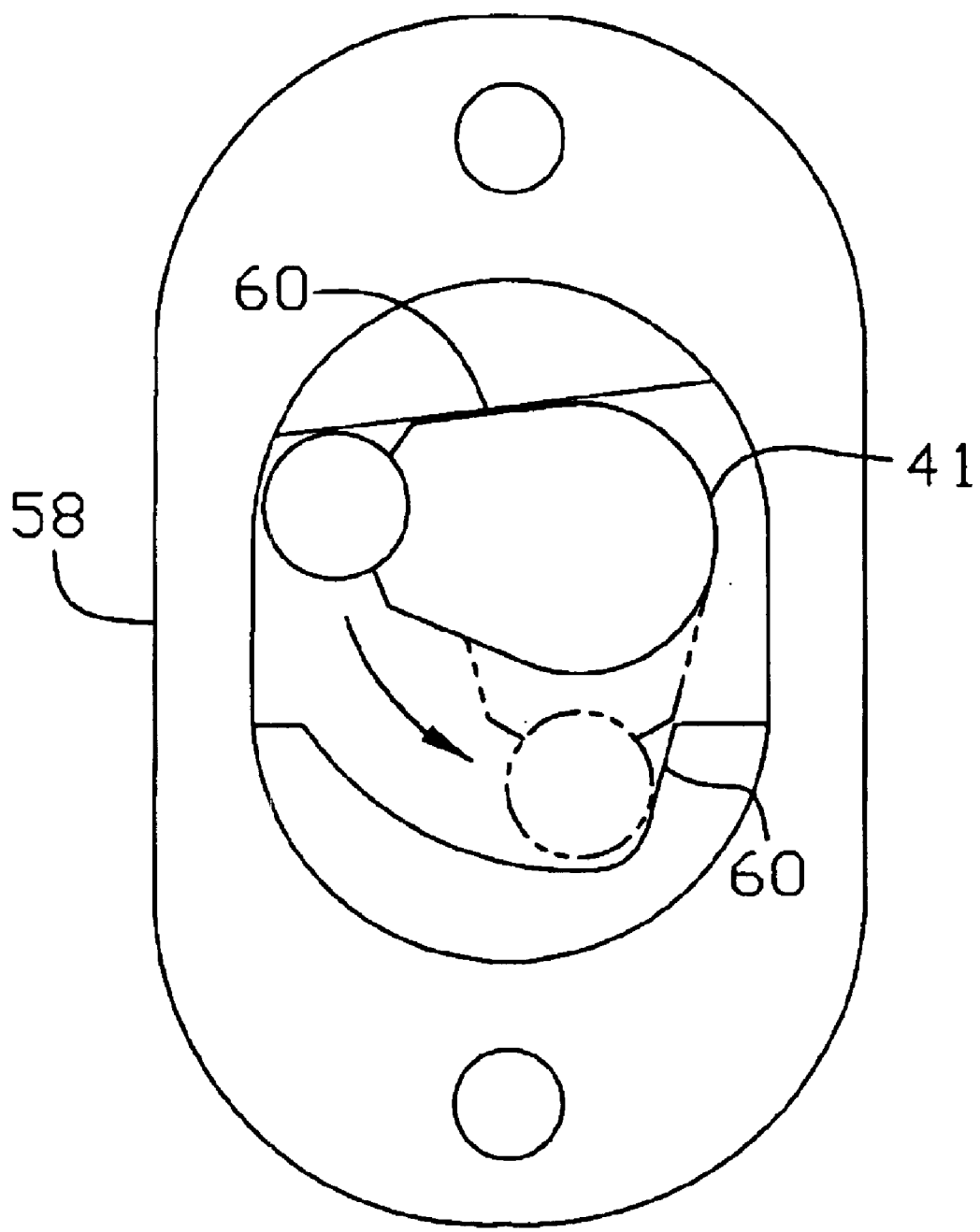
FIG. 14 is a bottom plan view of the sleeve and actuating cam of the first embodiment of the present invention.

Actuating handle 46 is mounted on shaft 44 by means of splines and retaining ring 52; any other known method could also be used. A sleeve 58 may be used between actuating cam 41 and handle 46 to provide stops 60, as shown in, e.g., FIGS. 1, 8 and 14. Screws 59 or similar methods could be used to secure sleeve 58 to housing 12. Sleeve 58 could also be integrally formed as part of housing 12. FIG. 14 shows a view from the bottom of sleeve 58, showing stops 60 formed therein to limit rotary movement of cam 41. Sleeve 58 is preferably formed of powdered metal, but can also be formed of zinc, plastic or another material suitable for the actuation forces. Cam 41 is shown in the disengaged position in solid lines and the engaged position in dashed lines in FIG. 14.

The specific shape and construction of load plate 35 and arms 45 is not critical, and the function of arms 45 could be performed by different structure within the scope of this invention. For example, arms 45 of load plate 35 could instead be formed as part of engagement dogs 42, which may eliminate the need for load plate 35.

Figure 20:
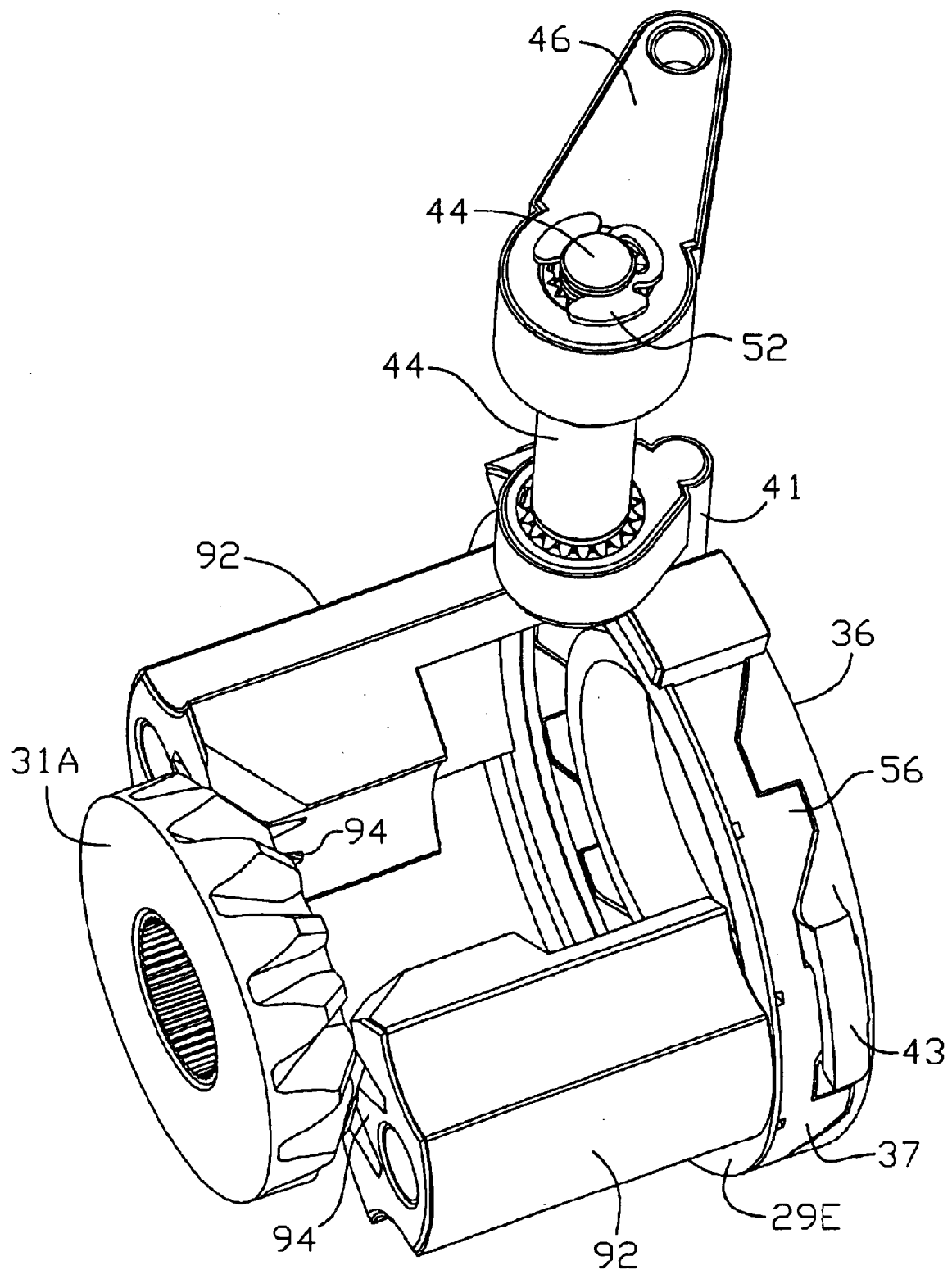
FIG. 20 is a detail perspective view of the cams and actuating mechanism of a fourth embodiment of this invention.

FIG. 20 shows an alternative embodiment, where like numerals indicate identical structure as discussed above. In this embodiment, engagement mechanism 92 performs the function of both dogs 42 and load plate 35 in the first embodiment described above. Axial movement of rotating cam 37 transfers force through bearing 29E directly to engagement mechanism 92, moving engagement mechanism 92 toward axle bevel gear 31A, placing gear teeth 94 into engagement therewith and creating differential locking as described above. This alternative embodiment does not require the annular ring design of load plate 35, although engagement mechanism 92 could incorporate such an annular ring at the end adjacent to rotating cam 37. Elimination of the annular ring feature facilitates manufacture of the component through a net shape forming process.

FIGS. 16–19 show an alternative embodiment in which like numerals indicate identical structure as described above. The actuating mechanism in this embodiment comprises actuating handle 71 and link sleeve 75 mounted on splined shaft 73 of pivoting link 77. A retaining ring (not shown) or similar device could be used to maintain the units on shaft 73. Splined shaft 73 could also be a separate component and pressed into or otherwise attached to pivoting link 77. Pivoting link 77 is engaged to translating link 79, which is itself engaged to an extension 68, which may be integrally formed rotating cam 67. Stationary cam 66 engages rotating cam 67 in the manner described above.

Figure 21:
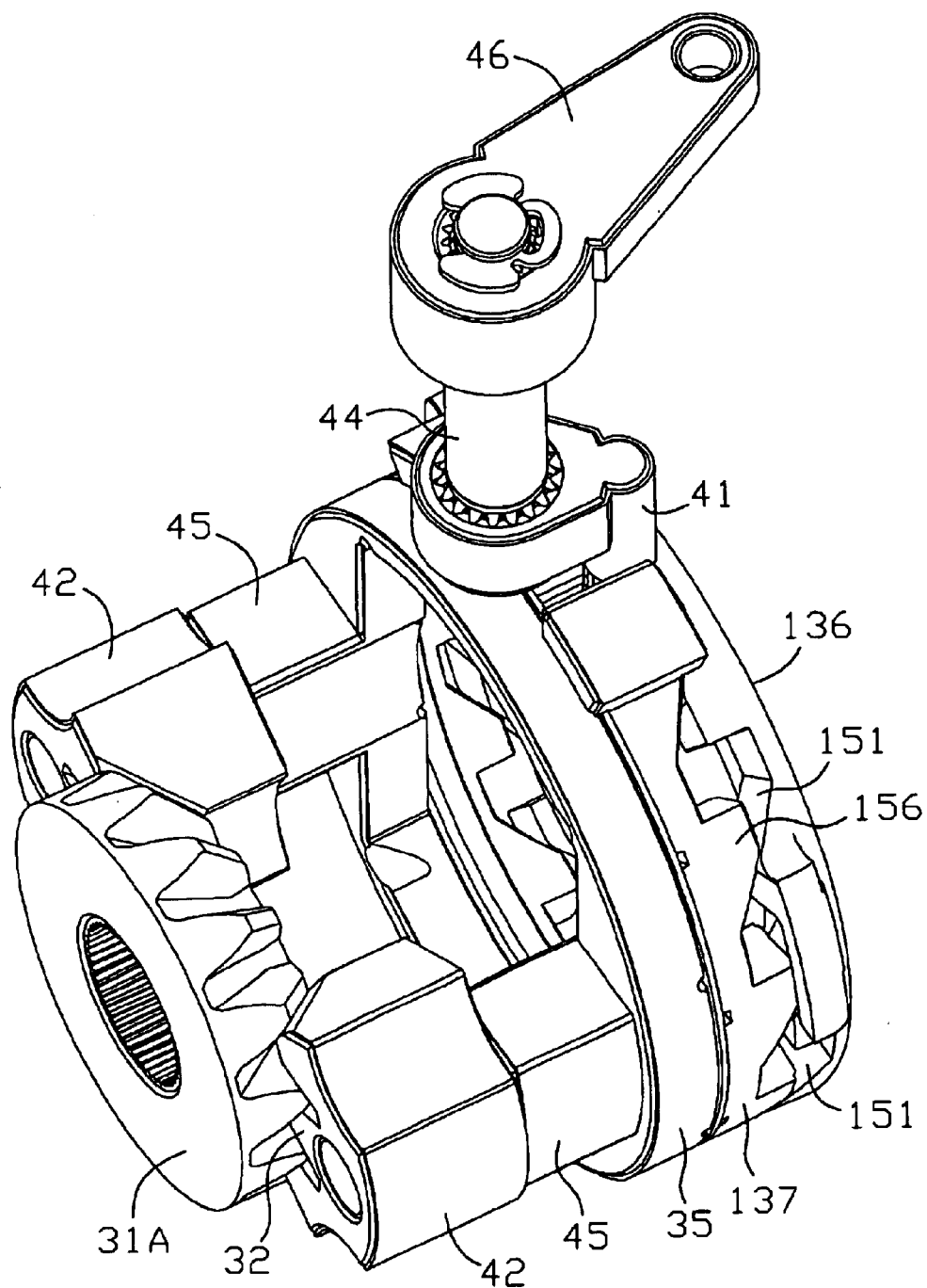
FIG. 21 is a detail perspective view similar to FIGS. 5 and 7 and showing a fifth alternative embodiment of this invention.

A further alternative embodiment is shown in FIG. 21, where the unit is biased towards a return to the unlocked position; i.e., it will stay in locked mode only so long as a force is applied to actuating cam 41 or until the force keeping rotating cam 137 in place is overcome by the separating force against gear teeth 32 axially transmitted through load plate 35. To accomplish this feature, the geometry of the cams 136 and 137, including cam teeth 156 and ramps 151, is modified to enable actuation of the unit while cam teeth 156 remain on ramps 151. In this manner a differential lock with overload protection may be implemented, wherein the force on actuator handle 46 establishes the disengagement or overload force. Rotation of actuating cam 41 could be limited by either stop 60 within sleeve 58 or other external stops (not shown) in order to maintain contact between rotating cam 137 and stationary cam 136 on teeth 156 and ramps 151, respectively. A similar feature could be incorporated into the embodiments shown in FIGS. 5 and 7 without modifying the cam geometry by changing the spatial relationships of gear dog 42 and axle bevel gear 31A. Such repositioning would decrease the clearance between gear dog 42 and axle bevel gear 31A. Therefore, the design of the ramps 51 in the embodiments shown in FIGS. 5 and 7 would need to be such to provide the axial movement of gear dogs 42 to allow full engagement and complete disengagement of dog teeth 32 and axle bevel gear 31A for the specific range of embodiments selected.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:

1. A vehicle driving apparatus comprising:
   a pair of output axles mounted in an axle housing, each output axle having an axle bevel gear mounted on one end thereof;
   a differential housing mounted in the axle housing and rotatable with respect to the axle housing;
   at least two differential gears mounted in the differential housing and rotating with respect to the axle bevel gears;
   an engagement mechanism engaged to and rotating with the differential housing, the engagement mechanism being movable in a direction along the axis of the output axles and having a first position where it is not engaged to either of the axle bevel gears and a second position where it is engaged to one of the axle bevel gears;
   a cam mechanism mounted in the axle housing where actuation of the cam mechanism causes the engagement mechanism to move from the first position to the second position, wherein the cam mechanism comprises a first stationary cam fixed with respect to the axle housing, a second cam which is rotatable with respect to the first cam and movable along the axis of the output axles, and an actuation member which is rotatable to cause rotation of the second cam with respect to the first cam.

2. A vehicle driving apparatus as set forth in claim 1, wherein the differential gears are bevel gears.

3. A vehicle driving apparatus as set forth in claim 1, wherein the cam mechanism further comprises a load plate mounted between the second cam and the engagement mechanism.

4. A vehicle driving apparatus as set forth in claim 1, wherein the stationary cam is integrally formed with the axle housing.

5. A vehicle driving apparatus as set forth in claim 1, wherein the stationary cam is formed separate from the axle housing.

6. A vehicle driving apparatus as set forth in claim 5, wherein the stationary cam comprises at least one tab formed therewith, and the axle housing comprises at least one opening formed therein to receive the tab to prevent the stationary cam from rotating with respect to the axle housing.

7. A vehicle driving apparatus as set forth in claim 5, wherein the stationary cam comprises a plurality of tabs formed therewith, and the axle housing comprises a plurality of openings formed therein to receive the tabs to prevent the stationary cam from rotating with respect to the axle housing.

8. A vehicle driving apparatus as set forth in claim 5, wherein the stationary cam is secured to the axle housing using a fastener.

9. A vehicle driving apparatus as set forth in claim 1, wherein the engagement mechanism comprises a gear dog.

10. A vehicle driving apparatus as set forth in claim 1, further comprising a plurality of engagement mechanisms mounted between the axle bevel gears.

11. A vehicle driving apparatus as set forth in claim 10, wherein the engagement mechanism comprise a plurality of gear dogs.

12. A vehicle driving apparatus as set forth in claim 1, further comprising a ring gear engaged to the axle housing.

13. A vehicle driving apparatus as set forth in claim 12, further comprising a plurality of planet reduction gears rotatably engaged to the ring gear.

14. A vehicle driving apparatus as set forth in claim 1, further comprising a plurality of pins engaged to the differential housing, a ring gear engaged to the axle housing; and a plurality of planet reduction gears, where each of the planet reduction gears is mounted on one of the pins.

15. A vehicle driving apparatus as set forth in claim 1, further comprising a hydrostatic transmission mounted in the axle housing.

16. A vehicle driving apparatus set forth in claim 15, wherein the hydrostatic transmission comprises a center section mounted in the housing and a rotatable pump and rotatable motor mounted on the center section.

17. A differential for driving a pair of output axles and mounted in a housing, comprising:
   a differential input gear;
   a gear carrier driven by the differential input gear;
   at least one planet bevel gear mounted in and rotatably driven by the gear carrier;
   a first axle bevel gear mounted on the first of the output axes and driven by the planet bevel gear, the first axle bevel gear having a plurality of gear teeth formed on one side thereof;
   a second axle bevel gear mounted on the second of the output axles and driven by the planet bevel gear, the second axle bevel gear having a plurality of gear teeth formed on one side thereof;
   a slider mechanism mounted in and rotatably driven by the gear carrier, the slider mechanism having a first position where it is not engaged to either axle bevel gear and a second position where it is engaged to the gear teeth of one of the axle bevel gears; and
   a cam mechanic mounted in the housing and engaged to the slider mechanism to move the slider mechanism from the first position to the second position, wherein the cam mechanism comprises a first cam mounted in the housing so as not to rotate with respect thereto, a second cam rotatable with respect to the first cam and movable in an axial direction, and a plate mechanism engaged to the second cam so that movement of the second cam in the axial direction causes the plate mechanism to contact and move the slider mechanism in the axial direction with respect to the output axles.

18. A differential as set forth in claim 17, further comprising a spring mechanism engaged to the slider mechanism to bias the slider mechanism to the first position.

19. A differential for driving a pair of output axles and mounted in a housing, comprising:
   a differential input gear;
   a gear carrier driven by the differential input gear;
   at least one differential gear driven by the gear carrier;
   a first axle bevel gear mounted on the first of the output axles and a second axle bevel gear mounted on the second of the output axles;
   at least one engagement element engaged to and rotating with the gear carrier, the engagement element being movable in a direction along the axis of the output axles and having a first position where the engagement element is not engaged to either axle bevel gear and a second position where the engagement element is engaged to one of the bevel gears;
   a first cam mounted in the housing so as not to rotate with respect thereto;
   a second cam rotatable with respect to the first cam and movable in an axial direction;
   a plate mechanism engaged to the second cam, so that movement of the second cam in the axial direction causes the engagement element to move from the first position to the second position to cause both axle bevel gears to rotate with the engagement element.

20. A differential as set forth in claim 19, further comprising a pair of engagement elements.

21. A differential as set forth in claim 20, further comprising a spring mechanism engaged to the engagement elements to bias the engagement element to the first position.

22. A differential as set forth in claim 21, further comprising a guide mounted on and rotated with the gear carrier, where the spring mechanism comprises a plurality of coil springs secured to the guide.

23. A differential as set forth in claim 22, comprising a plurality of differential gears.

24. A vehicle driving apparatus comprising:
   an axle housing;
   a first and second output axles mounted coaxially in the axle housing;
   a first axle bevel gear mounted on one end of the first output axle and having a front side having a plurality of gear teeth and a back side opposite to the front side;
   a second axle bevel gear mounted on one end of the second output axle and having a front side having a plurality of gear teeth and a back side opposite to the front side, wherein the front side of the first axle bevel gear is mounted facing the font side of the second axle bevel gear;
   a differential housing mounted in the axle housing and rotatable with respect to the axle housing;
   at least two differential gears mounted in the differential housing and rotating with respect to the axle bevel gears;
   an engagement mechanism mounted along the axis of the first and second output axles and between the two axle bevel gears and engaged to and rotating with the differential housing, the engagement mechanism being movable in a direction along the axis of the first and second output axles and having a first position where it is not engaged to either of the axle bevel gears and a second position where it is engaged to the gear teeth of one of the axle bevel gears; and
   a cam mechanism mounted in the axle housing where actuation of the cam mechanism causes the engagement mechanism to move from the first position to the second position, wherein the cam mechanism comprises a first stationary cam fixed with respect to the axle housing; a second cam which is rotatable with respect to the first cam and is movable along the axis of the output axles; and an actuation member which is rotatable to cause rotation of the second cam with respect to the first cam.

25. A vehicle driving apparatus as set forth in claim 24, wherein the cam mechanism further comprises a load plate mounted between the second cam and the engagement mechanism.

26. A vehicle driving apparatus as set forth in claim 24, wherein the stationary cam is integrally formed with the axle housing.

27. A vehicle driving apparatus set forth in claim 24, wherein the stationary cam is formed separate from the axle housing.

28. A vehicle driving apparatus as set forth in claim 27, wherein stationary cam comprises at least one tab formed therewith, and the axle housing comprises at least one opening formed therein to receive the tab to prevent the stationary cam from rotating with respect to the axle housing.

29. A vehicle driving apparatus is set forth in claim 24, wherein the stationary cam is secured to the axle housing through a fastener.

30. A vehicle driving apparatus as set forth in claim 24, wherein the engagement mechanism comprises a plurality of gear dogs.

31. A vehicle driving apparatus as set forth in claim 24, further comprising a ring gear engaged to the axle housing and a plurality of planet reduction gears rotatably engaged to the ring gear.

32. A vehicle driving apparatus as set forth in claim 24, further comprising a plurality of pins engaged to the differential housing, a ring gear engaged to the axle housing, and a plurality of planet reduction gears, where each of the planet reduction gears is mounted on one of the pins.

33. A vehicle driving apparatus as set forth in claim 24, further comprising a hydrostatic transmission mounted in the axle housing.

34. A vehicle driving apparatus as set forth in claim 33, wherein the hydrostatic transmission comprises a center section mounted in the housing and a rotatable pump and rotatable motor mounted on the center section.

35. A differential as set forth in claim 24, further comprising a spring mechanism engaged to the engagement elements to bias the engagement element to the first position.

36. A differential as set forth in claim 35, further comprising a guide mounted on and rotated with the differential housing, where the spring mechanism comprises a plurality of coil sprigs secured to the guide.

* * * * *